July 7, 1925.
C. A. BEST
BORING TOOL
Filed Nov. 12, 1924
1,545,030
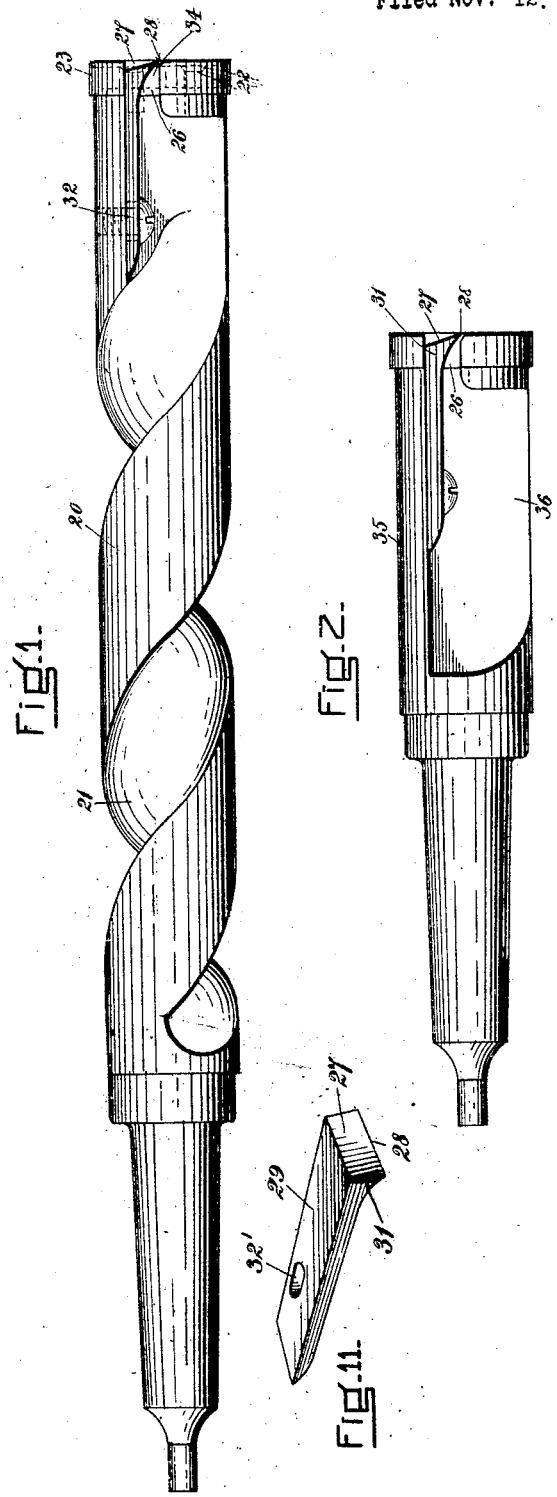
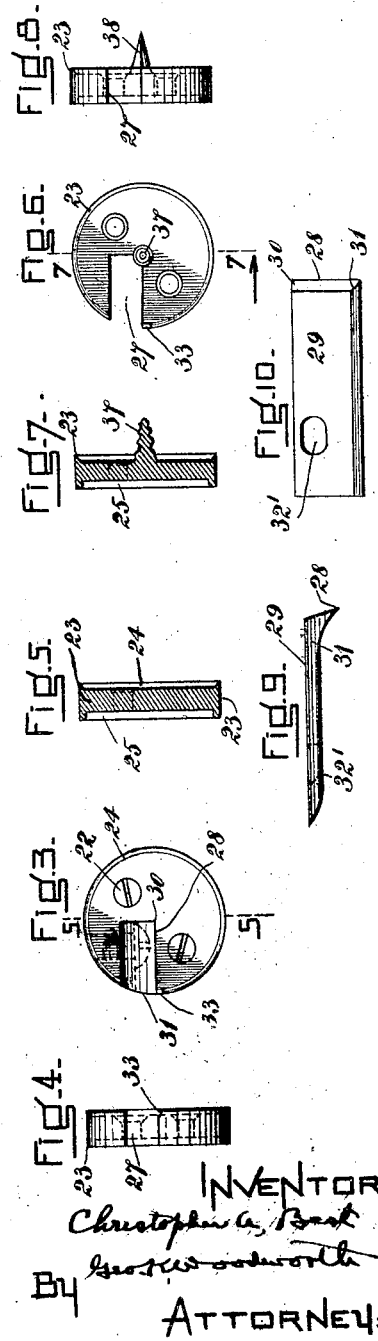

Patented July 7, 1925.

1,545,030

UNITED STATES PATENT OFFICE.

CHRISTOPHER A. BEST, OF NEW BEDFORD, MASSACHUSETTS, ASSIGNOR TO MORSE TWIST DRILL & MACHINE COMPANY, OF NEW BEDFORD, MASSACHUSETTS, A CORPORATION OF MASSACHUSETTS.

BORING TOOL.

Application filed November 12, 1924. Serial No. 749,429.

To all whom it may concern:

Be it known that I, CHRISTOPHER A. BEST, a citizen of the United States, and a resident of New Bedford, in the county of Bristol and State of Massachusetts, have invented a new and useful Improvement in Boring Tools, of which the following is a specification.

My invention relates to boring tools and more especially to such tools for boring wood and fibrous materials. It is the object of my invention to provide a boring tool having detachable cutting members which can be made of harder material than the other parts thereof and can easily be removed for sharpening or else replaced by others when worn out.

It is the further object of my invention to provide a boring tool which will bore holes truly round and to accurate size, which can be started into the work at any angle and will not work off center, which can be used to groove through the edge of the work, and for cutting into the side of a hole previously bored at any depth or at any angle without working off center.

With these objects in view my invention comprises a boring tool having a body portion provided with a chip-groove which may be either spiral or straight, a marker-tip of circular transverse section removably secured to the end of the body and provided with a peripheral cutting edge and with a slot extending longitudinally therethrough, said marker-tip having a centrally-projecting spur of any suitable shape, if desired, and a cutting blade detachably secured to the body and having its cutting edge located in the said slot, the cutting edge preferably coinciding with a radius of the marker-tip, the inner end thereof coinciding with the center of the marker-tip and the outer face thereof being arc-shaped and having a radius equal to that of said marker-tip.

In the drawings which accompany and form a part of this specification—

Fig. 1 is a side view of a boring tool embodying my invention;

Fig. 2 is a side view of a modification;

Fig. 3 is an end view of the boring tool shown in Figs. 1 and 2;

Fig. 4 is an edge view of the marker-tip;

Fig. 5 is a central longitudinal section of said marker-tip taken on the line 5—5 of Fig. 3;

Fig. 6 is an end view of a modified form of marker-tip having a centrally-projecting tapered screw-threaded spur;

Fig. 7 is a longitudinal section taken on the line 7—7 of the marker-tip shown in Fig. 6;

Fig. 8 is an edge view of a modified form of marker-tip having a centrally-projecting tapered square spur;

Fig. 9 is a side view of the cutting blade;

Fig. 10 is a plan view of said cutting blade; and

Fig. 11 is a perspective view of the cutting blade.

In the particular drawings selected for more fully disclosing the principle of my invention and which are to be considered as illustrative rather than restrictive, 20 represents the body of my boring tool provided with the usual helical chip-groove 21 and having secured to the forward end thereof by the screws 22 or other suitable means, a detachable marker-tip 23 which is provided on its forward face with a peripheral cutting edge or rim 24 and is preferably counterbored as indicated at 25 for receiving the mating shoulder 26 of the body 20, whereby said marker-tip may be centrally located on the end of said body. Passing longitudinally through the marker-tip from a diameter thereof to its circumference, is a slot 27 in which the cutting edge 28 of the cutting blade 29 is located, the inner end 30 of said blade coinciding with the center of the marker-tip, the cutting edge 28 being coincident with a radius of said marker-tip, and the outer face 31, thereof, being arc-shaped and having a radius equal to that of said marker-tip, so that said outer face fills the gap in the circumference of the marker-tip left by cutting the slot 27 longitudinally therethrough.

By means of the screw 32 passing through the eye 32' elongated to provide the necessary longitudinal adjustment, or in any other suitable manner, the cutting blade is secured to the body 20. The tip has sufficient longitudinal clearance to allow nothing but the peripheral cutting edge to be in contact with the work, thereby eliminating friction between the tip and the side of the hole, and the cutting blade is provided with an angular clearance on the lower side thereof, as indicated in Figs. 1 and 2.

The peripheral cutting edge 24 terminates immediately in front of the cutting edge 28, as indicated at 33, and the space 34 between the cutting edge 28 and the face of the marker-tip is sufficient to allow the chips to be guided through to the chip-groove 21.

In the modification shown in Fig. 2 the body 35 is provided with a single straight chip-groove 36.

The tool shown in Fig. 1 is designed for deep boring, and that illustrated in Fig. 2 for shallow boring. The marker-tip shown in Figs. 1, 2, 4 and 5 is employed when it is desired to make a flat-bottomed hole without a spur puncture in its center.

In Figs. 5 and 6 I show a marker-tip having a tapered screw-threaded spur 37 projecting forwardly from the center thereof, and in Fig. 8, a marker-tip having a centrally arranged tapered square spur point 38.

The marker-tips shown in Figs. 1, 2, 4, 5 and 8 are designed for tools intended for general machine work, while that shown in Fig. 7 is for hand-brace tools.

Having thus described illustrative embodiments of my invention without however limiting the same thereto, what I claim and desire to secure by Letters Patent is:—

1. A boring tool comprising a body having a chip-groove, a marker-tip of circular transverse section detachably secured to the end of said body, said tip being provided with a peripheral cutting edge and having a longitudinally-extending slot therethrough and a cutting blade detachably secured to said body and having its cutting edge located in said slot, said cutting edge coinciding with a radius of said marker-tip.

2. A boring tool comprising a body having a chip-groove, a marker-tip of circular transverse section detachably secured to the end of said body, said marker-tip being provided with a cutting rim and having a longitudinally-extending slot therethrough, and a cutting blade detachably secured to said body and having its cutting edge located in said slot, said cutting edge coinciding with a radius of said marker-tip, the inner end thereof coinciding with the center of said marker-tip and the outer face thereof being arc-shaped and having a radius equal to that of said marker-tip.

3. A boring tool comprising a body having a chip-groove, a marker-tip of circular transverse section, the rear face of said marker-tip being counterbored to receive the end of said body, and having a peripheral cutting edge and a slot extending longitudinally therethrough, means for securing said marker-tip to the end of said body, a cutting blade having its cutting edge located in said slot, said cutting edge coinciding with a radius of said marker-tip, and means for securing said cutting blade to said body.

4. A boring tool comprising a body having a chip-groove, a marker-tip of circular transverse section detachably secured to said body portion, said marker-tip being provided with a peripheral cutting edge and having a longitudinally-extending slot therethrough, a spur projecting centrally from the front face of said body and a cutting blade detachably secured to said body and having its cutting edge located in said slot, said cutting edge coinciding with a radius of said marker-tip.

In testimony whereof, I have hereunto subscribed my name this 8th day of November, 1924.

CHRISTOPHER A. BEST.